United States Patent
Pfeiffer et al.

(10) Patent No.: US 12,455,444 B2
(45) Date of Patent: Oct. 28, 2025

(54) OPTICAL SYSTEMS WITH LIGHT-EXPANDING COUPLERS

(71) Applicant: Apple Inc., Cupertino, CA (US)

(72) Inventors: Jonathan B. Pfeiffer, Lafayette, CO (US); Francesco Aieta, Alameda, CA (US); Se Baek Oh, Hillsborough, CA (US); Friso Schlottau, Mead, CO (US); Adam C. Urness, Boulder, CO (US)

(*) Notice: Subject to any disclaimer, the term of this patent is extended or adjusted under 35 U.S.C. 154(b) by 3 days.

(21) Appl. No.: 18/639,487

(22) Filed: Apr. 18, 2024

(65) Prior Publication Data

US 2024/0264434 A1  Aug. 8, 2024

Related U.S. Application Data

(63) Continuation of application No. 17/423,196, filed as application No. PCT/US2020/034587 on May 26, (Continued)

(51) Int. Cl.
*G02B 27/00* (2006.01)
*F21V 8/00* (2006.01)
(Continued)

(52) U.S. Cl.
CPC ....... *G02B 27/0081* (2013.01); *G02B 5/1814* (2013.01); *G02B 5/32* (2013.01);
(Continued)

(58) Field of Classification Search
CPC ...... G02B 5/1814; G02B 5/32; G02B 6/0011; G02B 6/0015; G02B 6/0016; G02B 6/124;
(Continued)

(56) References Cited

U.S. PATENT DOCUMENTS 7,418,170 B2    8/2008  Mukawa et al.
8,160,411 B2 *  4/2012  Levola ............... G02B 27/0172
                                                359/569
(Continued)

FOREIGN PATENT DOCUMENTS

CN    107797287 A    3/2018
CN    109154718 A    1/2019
(Continued)

OTHER PUBLICATIONS

Aieta et al., Multiwavelength Achromatic Metasurfaces by Dispersive Phase Compensation, Science Express, Feb. 19, 2015, p. 1-8, School of Engineering and Applied Sciences, Harvard University, Cambridge, MA, U.S.

*Primary Examiner* — Cory A Almeida
(74) *Attorney, Agent, or Firm* — Treyz Law Group, P.C.; Michael H. Lyons; Jinie M. Guihan

(57) ABSTRACT

An electronic device may include a display that generates light for an optical system that redirects the light towards an eye box. The optical system may include a waveguide, a non-diffractive input coupler, a cross coupler, and an output coupler. The cross coupler may expand the light in a first direction. The cross coupler may perform an even number of diffractions on the light and may couple the light back into the waveguide at an angle suitable for total internal reflection. The output coupler may expand the light in a second direction while coupling the light out of the waveguide. The cross coupler may include surface relief gratings or holographic gratings embedded within the waveguide or formed in a separate substrate. The optical system may direct the light towards the eye box without chromatic dispersion and while supporting an expanded field of view and optical bandwidth.

20 Claims, 12 Drawing Sheets

Related U.S. Application Data 2020, now Pat. No. 11,994,672, which is a continuation of application No. 16/831,147, filed on Mar. 26, 2020, now abandoned.

(60) Provisional application No. 62/854,905, filed on May 30, 2019.

(51) Int. Cl.
| | |
|---|---|
| *G02B 5/18* | (2006.01) |
| *G02B 5/32* | (2006.01) |
| *G02B 6/12* | (2006.01) |
| *G02B 6/124* | (2006.01) |
| *G02B 6/125* | (2006.01) |
| *G02B 27/01* | (2006.01) |
| *G02B 27/42* | (2006.01) |

(52) U.S. Cl.
CPC .......... *G02B 6/0016* (2013.01); *G02B 6/125* (2013.01); *G02B 27/0101* (2013.01); *G02B 27/0103* (2013.01); *G02B 27/0172* (2013.01); *G02B 27/4211* (2013.01); *G02B 27/4272* (2013.01); *G02B 6/0011* (2013.01); *G02B 6/0015* (2013.01); *G02B 2006/12107* (2013.01); *G02B 2006/12114* (2013.01); *G02B 2006/12147* (2013.01); *G02B 6/124* (2013.01); *G02B 2027/0123* (2013.01); *G02B 2027/0134* (2013.01); *G02B 2027/0174* (2013.01); *G02B 2027/0178* (2013.01)

(58) Field of Classification Search
CPC ................ G02B 6/125; G02B 27/0081; G02B 27/0101; G02B 27/0103; G02B 27/017; G02B 27/0172; G02B 27/4211; G02B 27/4272; G02B 2006/12107; G02B 2006/12114; G02B 2006/12147; G02B 2027/0123; G02B 2027/0134; G02B 2027/0174; G02B 2027/0178
See application file for complete search history.

(56) References Cited

U.S. PATENT DOCUMENTS

| | | | |
|---|---|---|---|
| 9,406,166 | B2 | 8/2016 | Futterer |
| 10,088,675 | B1 | 10/2018 | Brown et al. |
| 10,983,263 | B2 | 4/2021 | Kleinman et al. |
| 2002/0126942 | A1* | 9/2002 | Evans ............... G02B 6/12007 385/37 |
| 2011/0019874 | A1 | 1/2011 | Järvenpää et al. |
| 2014/0104665 | A1 | 4/2014 | Popovich et al. |
| 2014/0140654 | A1 | 5/2014 | Brown et al. |
| 2014/0218801 | A1 | 8/2014 | Simmonds et al. |
| 2017/0031171 | A1 | 2/2017 | Vallius et al. |
| 2017/0363871 | A1 | 12/2017 | Vallius et al. |
| 2018/0149791 | A1 | 5/2018 | Urness et al. |
| 2018/0252869 | A1 | 9/2018 | Ayres et al. |
| 2019/0064526 | A1 | 2/2019 | Connor |
| 2019/0227321 | A1* | 7/2019 | Lee ................... G02B 27/0101 |
| 2019/0377181 | A1 | 12/2019 | Myhre et al. |
| 2019/0391393 | A1 | 12/2019 | Ayres et al. |
| 2020/0166756 | A1 | 5/2020 | DeLapp et al. |
| 2020/0209630 | A1 | 7/2020 | Schultz et al. |
| 2020/0225476 | A1 | 7/2020 | Urness et al. |

FOREIGN PATENT DOCUMENTS

| | | | | |
|---|---|---|---|---|
| CN | 109416470 | A | | 3/2019 |
| EP | 1596226 | B1 * | 6/2012 | ........... G02B 5/1866 |
| JP | 2015529833 | A | | 10/2015 |
| JP | 2017049290 | A | | 3/2017 |
| JP | 2017513414 | A | | 5/2017 |
| JP | 2019510251 | A | | 4/2019 |
| WO | 2017047528 | A1 | | 3/2017 |
| WO | 2017223121 | A1 | | 12/2017 |
| WO | WO-2017222808 | A1 * | 12/2017 | ........... G02B 27/017 |
| WO | 2018160506 | A1 | | 9/2018 |
| WO | 2018231754 | A1 | | 12/2018 |

\* cited by examiner

OPTICAL SYSTEMS WITH LIGHT-EXPANDING COUPLERS

This application is a continuation of U.S. patent application Ser. No. 17/423,196, filed on Jul. 15, 2021, which is a national stage application filed under 35 U.S.C. § 371 of international patent application No. PCT/US2020/034587, filed May 26, 2020, which claims priority to U.S. patent application Ser. No. 16/831,147, filed on Mar. 26, 2020, and U.S. provisional patent application No. 62/854,905, filed May 30, 2019, which are hereby incorporated by reference herein in their entireties.

BACKGROUND

This relates generally to optical systems and, more particularly, to optical systems for displays.

Electronic devices may include displays that present images close to a user's eyes. For example, devices such as virtual reality and augmented reality headsets may include displays with optical elements that allow users to view the displays.

It can be challenging to design devices such as these. If care is not taken, the components used in displaying content may be unsightly and bulky and may not exhibit desired levels of optical performance.

SUMMARY

An electronic device such as a head-mounted device may have one or more near-eye displays that produce images for a user. The head-mounted device may be a pair of virtual reality glasses or may be an augmented reality headset that allows a viewer to view both computer-generated images and real-world objects in the viewer's surrounding environment.

The near-eye display may include a display unit that generates light and an optical system that redirects the light from the display unit towards an eye box. The optical system may include a waveguide, an input coupler on the waveguide, a cross coupler on the waveguide, and an output coupler on the waveguide. The input coupler may be a non-diffractive input coupler such as an input prism that couples the light into the waveguide and towards the cross coupler. The cross coupler may expand the light coupled into the waveguide in a first direction. The cross coupler may perform an even number of diffractions on the light and may couple the diffracted light back into the waveguide at an angle suitable for total internal reflection in the waveguide. The output coupler may receive the light from the cross coupler. The output coupler may expand the light in a second direction perpendicular to the first direction while coupling the light out of the waveguide.

The cross coupler may include surface relief gratings, meta-gratings, or holographic phase gratings such as volume holograms embedded within the waveguide or formed in a separate substrate adhered to an external surface of the waveguide. The optical system may direct the light towards the eye box without chromatic dispersion and while supporting an expanded field of view and optical bandwidth.

DETAILED DESCRIPTION

Figure 1:
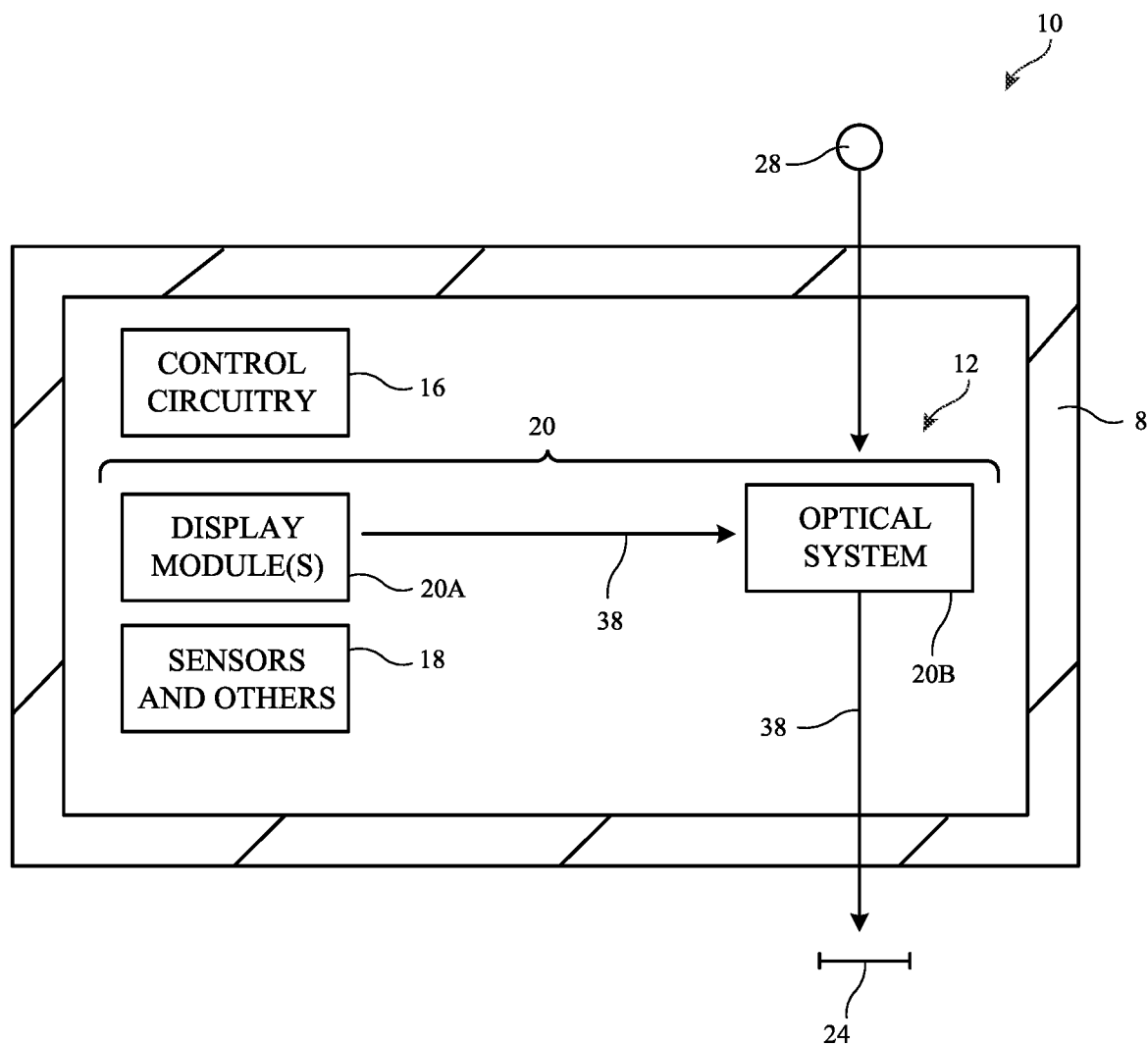
FIG. 1 is a diagram of an illustrative system having a display in accordance with some embodiments.

An illustrative system having a device with one or more near-eye display systems is shown in FIG. 1. System 10 may be a head-mounted device having one or more displays such as near-eye displays 20 mounted within support structure (housing) 8. Support structure 8 may have the shape of a pair of eyeglasses (e.g., supporting frames), may form a housing having a helmet shape, or may have other configurations to help in mounting and securing the components of near-eye displays 20 on the head or near the eye of a user. Near-eye displays 20 may include one or more display modules such as display modules 20A and one or more optical systems such as optical systems 20B. Display modules 20A may be mounted in a support structure such as support structure 8. Each display module 20A may emit light 38 (image light)

that is redirected towards a user's eyes at eye box 24 using an associated one of optical systems 20B.

The operation of system 10 may be controlled using control circuitry 16. Control circuitry 16 may include storage and processing circuitry for controlling the operation of system 10. Circuitry 16 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 16 may be based on one or more microprocessors, microcontrollers, digital signal processors, baseband processors, power management units, audio chips, graphics processing units, application specific integrated circuits, and other integrated circuits. Software code may be stored on storage in circuitry 16 and run on processing circuitry in circuitry 16 to implement operations for system 10 (e.g., data gathering operations, operations involving the adjustment of components using control signals, image rendering operations to produce image content to be displayed for a user, etc.).

System 10 may include input-output circuitry such as input-output devices 12. Input-output devices 12 may be used to allow data to be received by system 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which system 10 (e.g., head-mounted device 10) is operating. Output components in devices 12 may allow system 10 to provide a user with output and may be used to communicate with external electrical equipment. Input-output devices 12 may include sensors and other components 18 (e.g., image sensors for gathering images of real-world object that are digitally merged with virtual objects on a display in system 10, accelerometers, depth sensors, light sensors, haptic output devices, speakers, batteries, wireless communications circuits for communicating between system 10 and external electronic equipment, etc.).

Display modules 20A may be liquid crystal displays, organic light-emitting diode displays, laser-based displays, reflective displays, or displays of other types. Optical systems 20B may form lenses that allow a viewer (e.g., a viewer's eyes at eye box 24) to view images on display(s) 20. There may be two optical systems 20B (e.g., for forming left and right lenses) associated with respective left and right eyes of the user. A single display 20 may produce images for both eyes or a pair of displays 20 may be used to display images. In configurations with multiple displays (e.g., left and right eye displays), the focal length and positions of the lenses formed by optical system 20B may be selected so that any gap present between the displays will not be visible to a user (e.g., so that the images of the left and right displays overlap or merge seamlessly).

If desired, optical system 20B may contain components (e.g., an optical combiner, etc.) to allow real-world image light from real-world images or objects 28 to be combined optically with virtual (computer-generated) images such as virtual images in image light 38. In this type of system, which is sometimes referred to as an augmented reality system, a user of system 10 may view both real-world content and computer-generated content that is overlaid on top of the real-world content. Camera-based augmented reality systems may also be used in device 10 (e.g., in an arrangement which a camera captures real-world images of object 28 and this content is digitally merged with virtual content at optical system 20B).

System 10 may, if desired, include wireless circuitry and/or other circuitry to support communications with a computer or other external equipment (e.g., a computer that supplies display 20 with image content). During operation, control circuitry 16 may supply image content to display 20. The content may be remotely received (e.g., from a computer or other content source coupled to system 10) and/or may be generated by control circuitry 16 (e.g., text, other computer-generated content, etc.). The content that is supplied to display 20 by control circuitry 16 may be viewed by a viewer at eye box 24.

Figure 2:
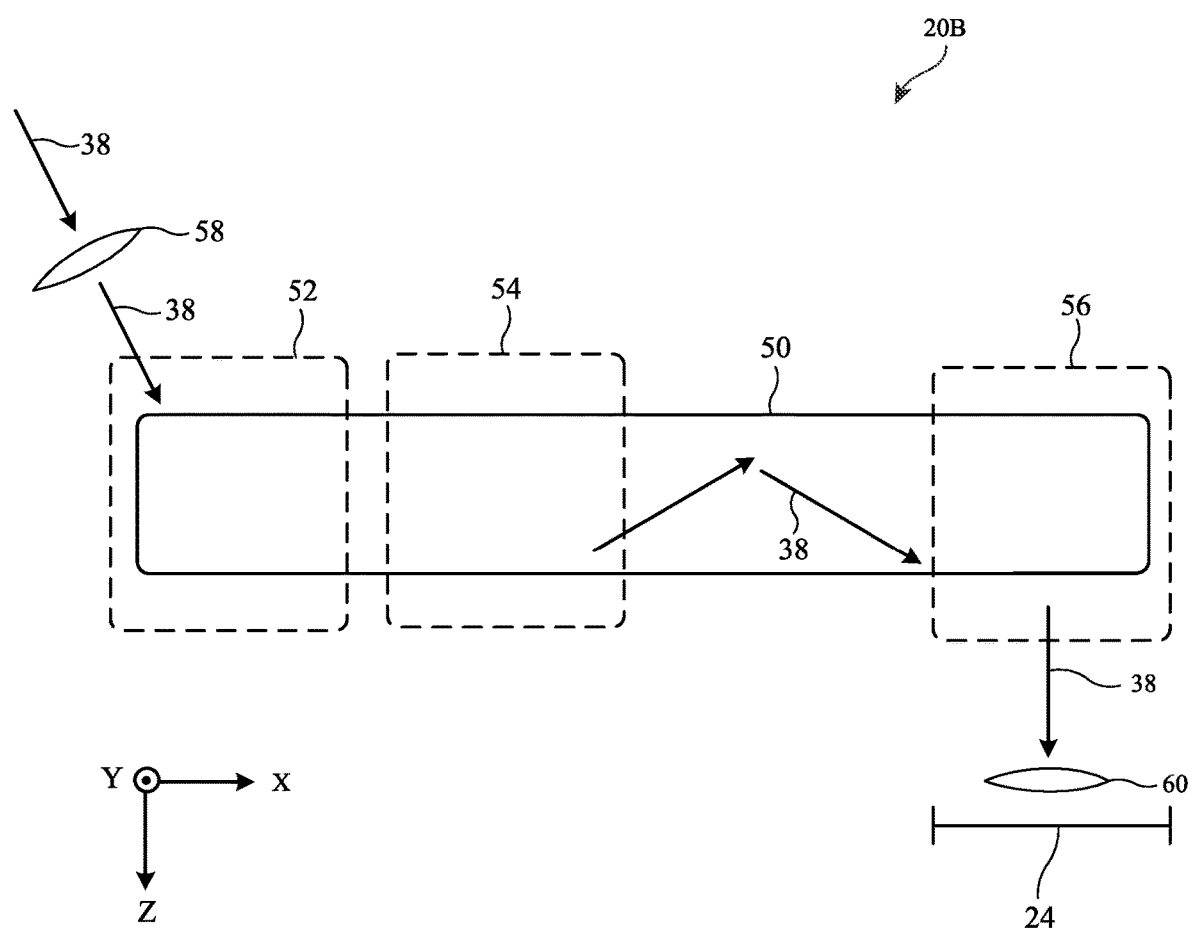
FIG. 2 is a top view of an illustrative optical system for a display that includes an input coupler, a cross coupler, and an output coupler in accordance with some embodiments.

FIG. 2 is a top view of an illustrative optical system 20B that may be used in system 10 of FIG. 1. As shown in FIG. 2, optical system 20B may include optical elements such as waveguide 50, input optics 58, output optics 60, input coupler 52, cross coupler 54, and output coupler 56. Input optics 58 may include collimating lenses or other optical components that pass image light 38 to input coupler 52. Image light 38 may be provided to optical system 20B by a display unit in display module 20A (FIG. 1). The display unit may be a display unit based on a liquid crystal display, organic light-emitting diode display, cathode ray tube, plasma display, projector display (e.g., a projector based on an array of micromirrors), liquid crystal on silicon display, or other suitable type of display. Optical system 20B may be used to present light 38 output from the display unit to eye box 24.

Waveguide structures such as waveguide 50 in optical system 20B may be formed from one or more stacked layers of polymer, glass, or other transparent substrates capable of guiding light via total internal reflection. Input coupler 52, cross coupler 54, and output coupler 56 may each be partially or completely embedded within waveguide 50 or mounted to a surface of waveguide 50. Some of optical couplers 52, 54, and 56 may be mounted to a surface of waveguide 50 whereas others of couplers 52, 54, and 56 are embedded within waveguide 50. Output optics 60 may include lenses that help to focus light 38 coupled out of waveguide 50 by output coupler 56 onto eye box 24. Input optics 58 and/or output optics 60 may be omitted if desired.

Input coupler 52 may be configured to couple light 38 from the display module into waveguide 50, whereas output coupler 32 may be configured to couple light 38 from within waveguide 50 out of waveguide 50 and towards eye box 24. For example, when light 38 from input optics 58 strikes input coupler 52, input coupler 52 may redirect light 38 so that the light propagates within waveguide 50 via total internal reflection towards output coupler 56 (e.g., in the direction of the X axis). When light 38 strikes output coupler 56, output coupler 56 may redirect light 38 out of waveguide 50 towards eye box 24 (e.g., along the Z axis).

In the example of FIG. 2, cross coupler 54 is optically interposed between input coupler 52 and output coupler 56. In this example, input coupler 52 may redirect light 38 towards cross coupler 54. Cross coupler 54 may expand light 38 in a first direction and may also couple (redirect) the expanded light back into waveguide 50. Waveguide 50 propagates the light expanded by cross coupler 54 via total internal reflection to output coupler 56. If desired, output coupler 56 may then expand the light received from cross coupler 54 in a second direction that is different from (e.g., perpendicular to) the first direction. Output coupler 56 may if desired, provide an optical power to the light coupled out of the waveguide. Consider an example in which the light 38 coupled into waveguide 50 by input coupler 52 includes a pupil of light. Expansion of light 38 by cross coupler 54 and output coupler 56 may serve to expand the pupil in multiple (e.g., orthogonal) dimensions, thereby allowing a relatively large eye box 24 to be filled with pupils of light 38 with a sufficient and substantially uniform intensity across the entire area of the eye box.

Input coupler 52, cross coupler 54, and output coupler 56 may be based on reflective and refractive optics or may be based on holographic (e.g., diffractive) optics. In arrangements where couplers 52, 54, or 56 are formed from reflective and refractive optics, the couplers may include one or more reflectors (e.g., an array of micromirrors, partial mirrors, or other reflectors). In arrangements where couplers 52, 54, or 56 are based on holographic optics, couplers 52, 54, and 56 may include holographic media such as photopolymers, gelatin such as dichromated gelatin, silver halides, holographic polymer dispersed liquid crystal, or other suitable volume holographic media. Holographic recordings (e.g., holographic phase gratings sometimes referred to herein as holograms) may be stored in the holographic media. The holographic media may sometimes be referred to herein as grating media.

A holographic recording may be stored as an optical interference pattern (e.g., alternating regions of different indices of refraction) within a photosensitive optical material such as the holographic media. The optical interference pattern may create a holographic phase grating that, when illuminated with a given light source, diffracts light to create a three-dimensional reconstruction of the holographic recording. The holographic phase grating may be a non-switchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of grating medium if desired. The holographic phase gratings may be, for example, volume holograms in the grating medium.

If desired, one or more of couplers 52, 54, and 56 may be implemented using other types of diffraction grating structures such as surface relief grating structures. Surface relief grating structures include diffraction gratings (e.g., surface relief gratings) that are mechanically cut, etched, or otherwise formed in a surface relief grating medium. The surface relief gratings diffract light that is incident upon the surface relief gratings. Rather than modulating index of refraction in the grating medium (as performed to create holographic phase gratings such as volume holograms), surface relief gratings are produced by varying the physical thickness of the medium across its lateral area. Multiple surface relief gratings (e.g., two surface relief gratings) may be multiplexed within the same volume of surface relief grating medium if desired.

In one suitable arrangement that is sometimes described herein as an example, input coupler 52 is a non-diffractive input coupler (e.g., an input coupler that does not include diffraction gratings such as surface relief gratings or holographic phase gratings). For example, input coupler 52 may include an input prism, an angled surface (edge) of waveguide 50, etc. Use of a non-diffractive input coupler such as an input prism may allow light 38 to be coupled into waveguide 50 without producing the chromatic dispersion that is otherwise associated with input-coupling using diffractive elements. In another suitable arrangement, input coupler 52 may be formed using diffraction gratings such as volume holograms or other grating structures. In these scenarios, any chromatic dispersion introduced by the input coupler may be reversed by the output coupler in diffracting the light out of the waveguide (e.g., in a scenario where the output coupler includes holographic phase gratings such as volume holograms).

Cross coupler 54 may include diffractive grating structures that diffract the light 38 coupled into waveguide 50 by the (non-diffractive) input coupler 52. The grating structures in cross coupler 54 may include surface relief grating structures (e.g., one or more surface relief gratings) or phase grating structures such as volume holographic grating structures (e.g., a set of at least partially overlapping volume holograms). The grating structures in cross coupler 54 may be configured to diffract light 38 an even number of times. At least one of the diffractions may serve to expand light 38 in a first direction (e.g., along the Y axis into and/or out of the plane of FIG. 2). At least one of the diffractions may serve to redirect the expanded light back into waveguide 50 at an angle such that the light propagates by total internal reflection to output coupler 54. By diffracting the light an even number of times, any chromatic dispersion effects associated with diffracting the light one time can be reversed by diffracting the light a corresponding subsequent time. This may serve to mitigate chromatic dispersion of the light that is conveyed to output coupler 56.

Output coupler 56 may include diffractive grating structures such as volume holographic grating structures or other holographic phase gratings. In another suitable arrangement, output coupler 56 may include reflective mirror structures such as a louvred mirror. Output coupler 56 may reflect or diffract light 38. The reflection/diffraction of light 38 by output coupler 56 may serve to expand light 38 in a second direction (e.g., along the X axis) and to couple the expanded light out of waveguide 50 towards eye box 24.

Figure 3:
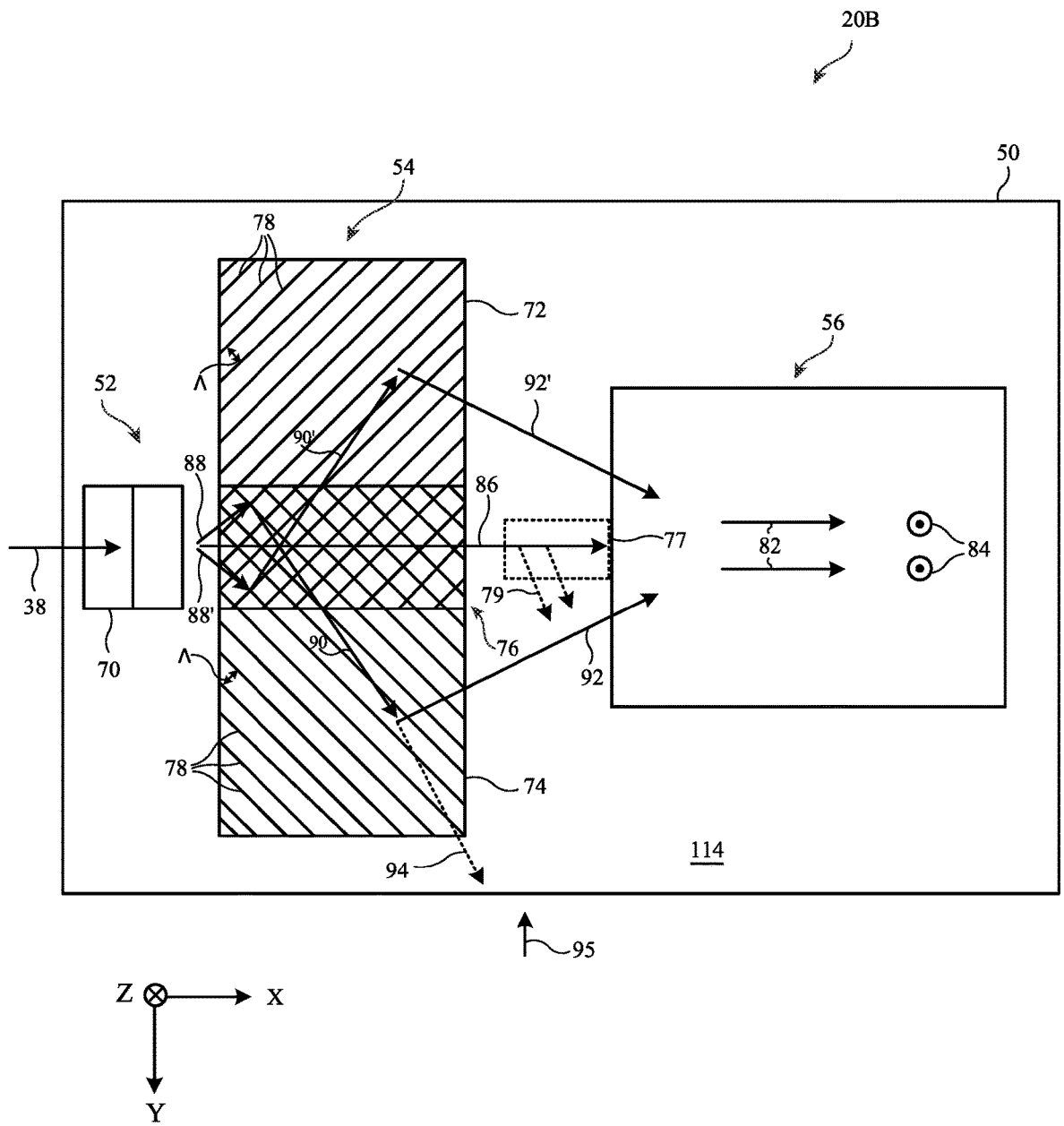
FIG. 3 is a front view of an illustrative optical system having a cross coupler that diffracts in-coupled light an even number of times while expanding the light in a first direction and having an output coupler that expands the light in a second direction in accordance with some embodiments.

FIG. 3 is a front view of waveguide 50 showing how cross coupler 54 may include grating structures that expand light 38 while also diffracting light 38 an even number of times to mitigate chromatic dispersion. As shown in FIG. 3, waveguide 50 may include a waveguide substrate with a lateral (external) surface 114. A non-diffractive input coupler 52 such as input prism 70 may be mounted to surface 114. Input prism 70 may couple light 38 downwards (e.g., in the +Z direction) into waveguide 50 and towards cross coupler 54. Cross coupler 54 may be formed on a lateral surface of a waveguide substrate in waveguide 50 or may be embedded within waveguide 50.

Cross coupler 54 may include a first diffractive grating structure 72 and a second diffractive grating structure 74. First grating structure 72 may at least partially overlap second grating structure 74 (e.g., within overlap region 76). Grating structures 72 and 74 may for example, be superimposed over each other within the same volume (area) of grating medium within overlap region 76. Overlap region 76 may have a width (e.g., parallel to the Y axis) that is approximately equal to (e.g., greater than or equal to) the width of input prism 70. This is merely illustrative. Overlap region 76 may have a width that is less than or equal to the width of input prism 70 or may have other shapes. Overlap region 76 need not have a uniform width.

Light 38 that is coupled into waveguide 50 parallel to the X-axis (sometimes referred to herein as DC light 86) may be directed by cross coupler 54 back into waveguide 50 and towards output coupler 56 without being expanded in the vertical direction. DC light 86 may propagate down the length of waveguide 50 to output coupler 56 via total internal reflection. Light 38 that is coupled into waveguide 50 at a non-zero angle with respect to the X-axis may be vertically expanded by first grating structure 72 and/or second grating structure 74 (e.g., by diffracting the light vertically in a direction parallel to the Y axis, sometimes referred to herein as a "first direction"). First grating structure 72 and/or second grating structure 74 may be configured to cumulatively diffract light 38 an even number of times by the time the light re-enters waveguide 50 for propagation to output coupler 56 by total internal reflection (e.g., to mitigate chromatic dispersion generated by a single instance of diffraction).

As an example, light 38 at a positive angle with respect to DC light 86 may be coupled into waveguide 50 and directed towards cross coupler 54, as shown by arrow 88. First grating structure 72 may include fringes 78 that are oriented at a non-parallel angle with respect to the fringes 78 in second grating structure 74. First grating structure 72 and second grating structure 74 may include surface relief gratings or holographic phase gratings such as volume holograms. In scenarios where grating structures 72 and 74 are formed from holographic phase gratings, fringes 78 may represent lines of constant index of refraction of the grating medium. In scenarios where grating structures 72 and 74 are formed using surface relief gratings, fringes 78 may represent lines of constant thickness of the grating medium. Fringes 78 are characterized by a period Λ (e.g., the period of the modulations in refractive index or the period of the modulations in thickness of the grating medium) and an orientation (e.g., defined by the direction of a grating vector for grating structures 72 and 74, where the grating vector is oriented perpendicular to fringes 78). Fringes 78 may also have an associated fringe angle defined with respect to the normal surface of lateral surface 114.

The periods, orientations, and fringe angles of grating structures 72 and 74 may configure the grating structures to diffract light from particular ranges of incident angles and at a particular range of wavelengths over particular ranges of output angles. These factors may be selected to configure cross coupler 54 to vertically expand light 38 while diffracting the light an even number of times and while diffracting the light back into waveguide 50 at an angle at which the light can be propagated down waveguide 50 via total internal reflection, for the wavelengths (colors) included in light 38 and over the incident angles with which the light is provided to the cross coupler by input prism 70.

Consider an example in which grating structures 72 and 74 are formed using surface relief gratings. In this example, grating structure 74 may be configured to perform a first diffraction in which light at the incident angle associated with arrow 88 (e.g., light incident in the +X, −Y, and −Z directions) is diffracted at a corresponding output angle, as shown by arrow 90 (e.g., an output angle in the +Y and +X directions). Grating structure 74 may also be configured to perform a (subsequent) second diffraction in which the light at the incident angle associated with arrow 90 (e.g., the output angle of the first diffraction) is diffracted at a corresponding output angle, as shown by arrow 92 (e.g., an output angle in the +X, −Y, and +Z directions). The first diffraction may introduce chromatic dispersion in which different wavelengths of incident light 38 are diffracted at slightly different output angles. The second diffraction may reverse the chromatic dispersion introduced by the first diffraction (e.g., by diffracting the light from the first diffraction back into waveguide 50 at the same output angle for each wavelength). The second diffraction that produced arrow 92 may direct the light back into waveguide 50 at an angle such that the light is able to propagate down the length of waveguide 50 by total internal reflection to output coupler 56.

Similarly, grating structure 72 may be configured to perform a first diffraction in which light at the incident angle associated with arrow 88' (e.g., light incident in the +X, +Y, and −Z directions) is diffracted at a corresponding output angle, as shown by arrow 90' (e.g., an output angle in the −Y and +X directions). Grating structure 72 may also be configured to perform a (subsequent) second diffraction in which the light at the incident angle associated with arrow 90' (e.g., the output angle of the first diffraction) is diffracted at a corresponding output angle, as shown by arrow 92' (e.g., an output angle in the +X, +Y, and +Z direction). The first diffraction may introduce chromatic dispersion in which different wavelengths of incident light 38 are diffracted at slightly different output angles. The second diffraction may reverse the chromatic dispersion introduced by the first diffraction. The second diffraction associated with arrow 92' may direct the light back into waveguide 50 at an angle such that the light is able to propagate down the length of waveguide 50 by total internal reflection to output coupler 56.

Diffraction in the vertical direction (e.g., in the +Y/−Y direction) by grating structures 72 and 74 may serve to expand light 38 in the vertical direction (e.g., parallel to the Y axis). Output coupler 56 may diffract or reflect the light received from cross coupler 54 towards the eye box, as shown by arrows 84, while also expanding the light in a horizontal direction that is different from (e.g., orthogonal to) the vertical direction (e.g., output coupler 56 may expand the light in a direction parallel to the X axis, as shown by arrows 82). This may allow pupils in the light coupled into waveguide 50 to be expanded in two dimensions by the time the light is received at the eye box.

Grating structures 72 and 74 may each perform the first diffraction over a range of angles about DC light 86 (e.g., grating structures 72 may diffract light 38 over a continuous range of incident angles between arrow 88 and the X axis whereas grating structures 74 diffract light 38 over a continuous range of incident angles between arrow 88' and the X axis). The second diffraction performed by grating structures 72 and 74 may similarly be performed over a corresponding range of incident angles. If desired, diffraction grating structures (e.g., volume holograms, surface relief gratings, etc.) such as optional diffractive beam dump 77 may be formed on waveguide 50. Diffractive beam dump 77 may be configured to diffract low angle light such as DC light 86 to locations other than output coupler 56 (e.g., towards other optics, a light sink such as an absorptive material, etc.), as shown by arrows 79. This may help to ensure that light of uniform intensity is provided to output coupler 56, for example (e.g., because DC light 86 may be brighter than diffracted light 92' and 92).

Surface relief gratings exhibit a relatively wide bandwidth in wavelength. This may allow grating structures 72 and 74 to each be implemented using a single surface relief grating, if desired, while still exhibiting satisfactory diffraction efficiency for each wavelength of light 38 (e.g., across the visible spectrum). In other words, cross coupler 54 may diffract and expand light 38 for each wavelength in light 38 using only two surface relief gratings (e.g., one surface relief grating in grating structure 72 and another surface relief grating in grating structure 74). In another suitable arrangement, more than two surface relief gratings may be included in cross coupler 54. In these scenarios, additional layers of surface relief grating medium may be stacked on top of each other, where each layer includes one or two associated surface relief gratings.

In scenarios where grating structures 72 and 74 are implemented using holographic phase gratings such as volume holograms, each volume hologram exhibits a much narrower bandwidth in wavelength than a surface relief grating. For example, volume holograms diffract light from a particular range of incident angles at a particular range of output angles for a particular range of wavelengths that is much narrower than the range of wavelengths diffracted by a similar surface relief grating. To diffract each wavelength in light 38, grating structures 72 and 74 may each include a corresponding set of multiplexed volume holograms (or other holographic phase gratings). Each volume hologram in the set may be configured to diffract (e.g., may be Bragg-matched to) light from a different respective range of wavelengths and/or range of incident angles, but may each diffract the incident light at the same range of output angles. Each volume hologram in the set may be at least partially overlapping. For example, each volume hologram in the set may be superimposed within the same volume of grating medium or may be divided between different layers of grating medium (e.g., where each layer includes at least one volume hologram from the set). In this way, the holographic phase gratings (e.g., volume holograms) in cross coupler 54 may collectively perform an even number of diffractions (e.g., the diffractions represented by arrows 88, 90, 92, 88', 90', and 92') on incident light over a wide range of wavelengths and over each of the incident angles provided by input prism 70. The set of volume holograms in grating structures 72 may sometimes be referred to herein as volume hologram structures. Similarly, the set of volume holograms in grating structures 74 may sometimes be referred to herein as volume hologram structures.

The example of FIG. 3 shows only two diffraction operations being performed by each grating structure. This is merely illustrative. If desired, each grating structure may perform four diffraction operations, six diffraction operations, eight diffraction operations, or any other desired even number of diffractions. Performing an even number of diffractions in this way may allow any chromatic dispersion associated with a first diffraction to be reversed by a corresponding additional diffraction and may allow the light to be redirected towards output coupler 56. If only a single diffraction operation (or any other odd number of diffraction operations) were performed, the light may be directed elsewhere in the system (e.g., away from output coupler 56, as shown by arrow 94). In these scenarios, if desired, output coupler 56 may be repositioned or expanded in size so that stray light associated with arrow 94 is also received at the output coupler. In addition to light that has been diffracted an even number of times, some of the image light coupled into the waveguide may pass to the output coupler without ever being diffracted by the cross coupler (e.g., the architecture of FIG. 3 may not require an interaction with the cross coupler for certain parts of the image).

In another suitable arrangement, cross coupler 54 may be implemented using meta-grating structures (e.g., grating structures 72 and 74 may each be formed using respective meta-grating). Other types of diffraction gratings (e.g., non-meta-gratings) typically exhibit a periodic structure and chromatic dispersion. For example, propagation angle on the first diffraction by the grating changes as a function of wavelength and consequentially, pupil replications at different wavelengths will be spatially separated inside the waveguide. The propagation angle is restored on the second diffraction by the grating (e.g., compensating for dispersion). However, pupil separation may produce color non-uniformity to the image.

In contrast, meta-gratings are aperiodic assemblies of high index dielectric resonators (e.g., formed on surface 114 of waveguide 50 or other surfaces on or in the waveguide). Meta-gratings in grating structures 72 and 74 may for example, be formed on surface 114 of waveguide 50. Each dielectric resonator in the meta-gratings may be designed to impart a phase delay to the incident light. The phase delay of each dielectric resonator may be independently controlled for a different wavelength. Through suitable configuration of the distribution of the dielectric resonators, a wavelength dependent phase profile may be obtained such that all the wavelengths are diffracted at the same output angle. In this way, the pupil can propagate and expand without introducing color separation.

Figure 4:
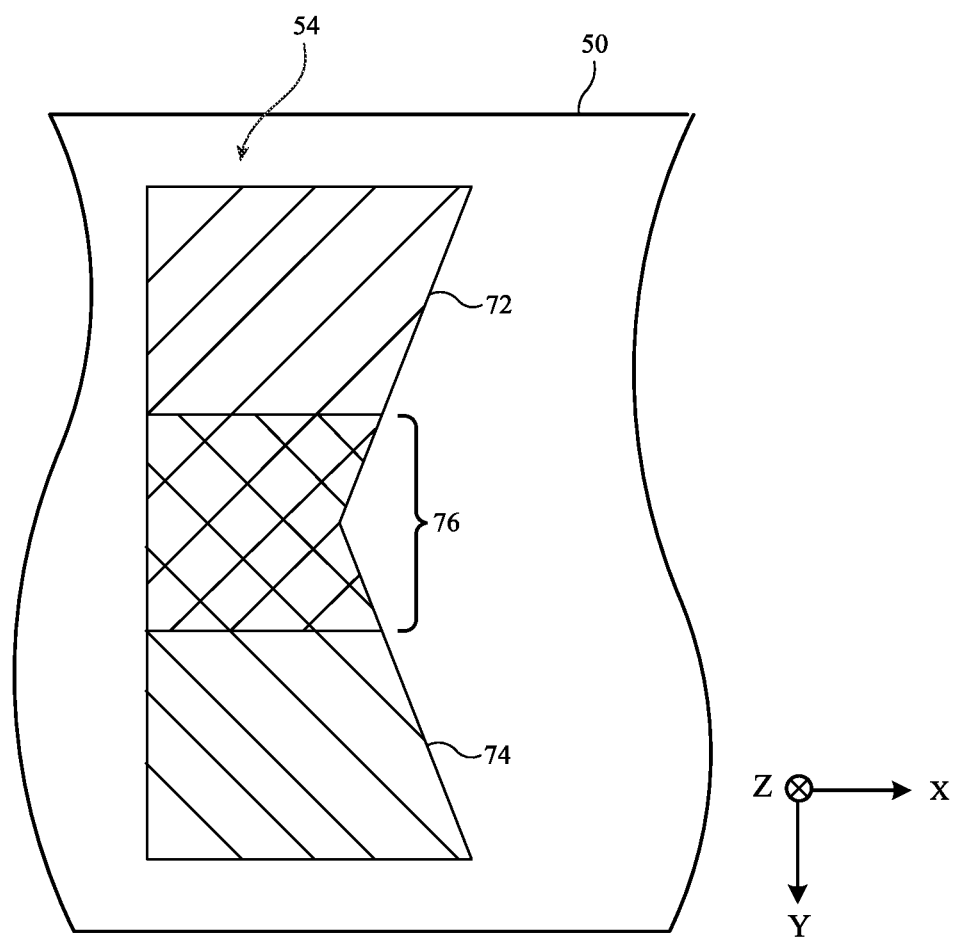
FIG. 4 is a diagram of an illustrative cross coupler having a non-rectangular shape in accordance with some embodiments.

The example of FIG. 3 in which cross coupler 54 has a rectangular shape is merely illustrative. In general, cross coupler 54 (e.g., first grating structure 72, second grating structure 74, and/or overlap region 76) may have any desired shape having any desired number of straight and/or curved edges (e.g., a triangular shape, a trapezoidal shape, other polygonal shapes, a circular shape, an elliptical shape, combinations of these, etc.). FIG. 4 is a diagram of one possible shape for cross coupler 54. As shown in FIG. 4, cross coupler 54 may have five sides and overlap region 76 may have five sides. First grating structure 72 and second grating structure 74 may have non-uniform lengths (e.g., parallel to the X axis). The shape of cross coupler 54 may be selected to maximize the amount of light received at output coupler 56 (FIG. 3), for example. Other shapes may be used. Output coupler 56 may also be provided with any desired shape and need not be rectangular. If desired, cross coupler 54 may be formed using only one of first grating structure 72 or second grating structure 74. If desired, grating structures 72 and 74 may be non-overlapping (e.g., overlap region 76 may be omitted).

Figure 5:
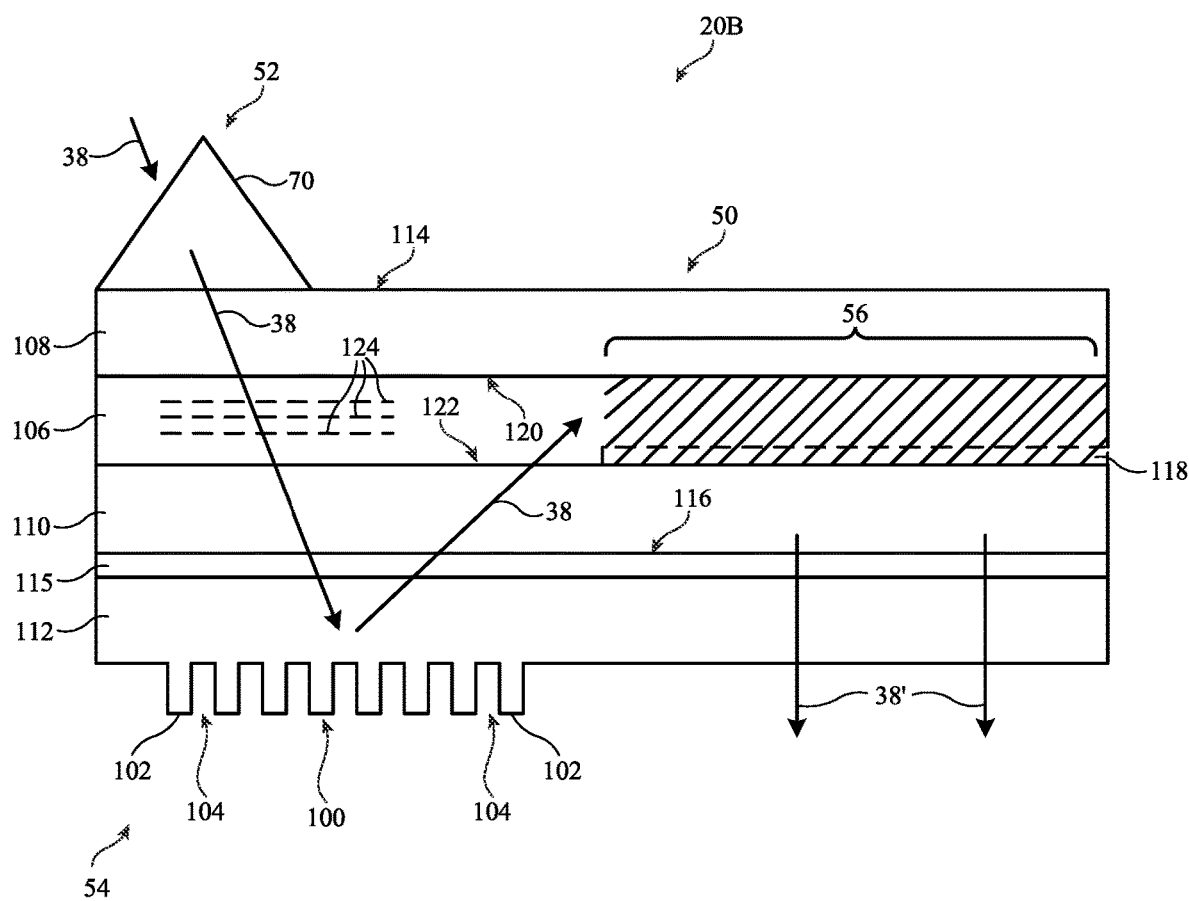
FIG. 5 is a cross-sectional top view of an illustrative waveguide having a cross coupler formed from a surface relief grating structure on the waveguide in accordance with some embodiments.

FIG. 5 is a cross-sectional top view of waveguide 50 in an example where cross coupler 54 is formed using a surface relief grating structure (e.g., as viewed in the direction of arrow 95 of FIG. 3). As shown in FIG. 5, waveguide 50 may include one or more waveguide substrates such as substrate 108 and substrate 110. A holographic recording medium such as grating medium 106 may be interposed (layered) between substrates 108 and 110. Lateral (e.g., planar) surface 120 of grating medium 106 may contact substrate 108. Lateral surface 122 of grating medium 106 may contact substrate 110. Output coupler 56 may be formed within grating medium 106 (e.g., using volume holograms or other holographic phase gratings recorded in grating medium 106, louvred mirrors embedded in grating medium 106, etc.). If desired, an optional antireflection coating 118 may be layered onto surface 120 and/or surface 122 at output coupler 56. Antireflection coating 118 may prevent unwanted light reflections within grating medium 106 during the writing (recording) of the holographic phase gratings within output coupler 56, for example.

Input prism 70 may be mounted to external surface 114 of substrate 108. Input prism 70 may couple image light 38 into waveguide 50 and towards cross coupler 54. Cross coupler 54 may include a surface relief grating structure such as surface relief grating structure 100. Surface relief grating structure 100 may be used to form first grating structure 72 (e.g., surface relief grating structure 100 may include a surface relief grating that performs at least the first and second diffractions associated with arrows 88', 90', and 92' of FIG. 3), may be used to form second grating structure 74 (e.g., surface relief grating structure 100 may include a surface relief grating that performs at least the first and second diffractions associated with arrows 88, 90, and 92 of FIG. 3), or may be used to form overlap region 76 (e.g., surface relief grating structure 100 may include a surface relief grating used to form first grating structure 72 and a surface relief grating used to form second grating structure 74 that are superimposed within the same area).

As shown in FIG. 5, surface relief grating structure 100 may be formed within a substrate such as surface relief grating substrate (medium) 112. As an example, the surface relief grating(s) in surface relief grating structure 100 may be defined by ridges (peaks) 102 and troughs (minima 104) in the thickness of surface relief grating substrate 112. In the example of FIG. 5, surface relief grating structure 100 is a binary structure in which the grating is defined either by a first thickness associated with peaks 102 or a second thickness associated with troughs 104. This is merely illustrative. If desired, surface relief grating structure 100 may be non-binary (e.g., may include any desired number of thicknesses following any desired profile, may include peaks 102 that are angled at non-parallel fringe angles with respect to the Y axis, etc.). Surface relief grating substrate 112 may exhibit a relatively high index of refraction (e.g., an index of refraction greater than the bulk index of refraction of grating medium 106). Surface relief grating substrate 112 may be adhered to surface 116 of waveguide substrate 110 using adhesive layer 115. Adhesive layer 115 may have a relatively low index of refraction (e.g., less than the index of refraction of surface relief grating substrate 112). Surface relief grating structure 100 may be fabricated separately from output coupler 56 in waveguide 50 and may be adhered to waveguide 50 after fabrication, for example.

Input prism 70 may image couple light 38 into waveguide 50 and towards surface relief grating structure 100. Surface relief grating structure 100 may diffract light 38 and even number of times while serving to expand light 38 in a direction parallel to the Y axis. The final diffraction performed by surface relief grating structure 100 may couple light 38 (e.g., as expanded light) back into waveguide 50 at an angle such that the light continues to propagate along the length of waveguide 50 by total internal reflection. Light 38 is then coupled out of waveguide 50 by output coupler 56, as shown by arrows 38'. Output coupler 56 may also expand light 38 in a direction parallel to the X axis. In this way, output coupler 56 and cross coupler 54 may collectively expand light 38 in two dimensions prior to providing the expanded light to the eye box.

Forming cross coupler 54 using a surface relief grating structure may allow for higher light throughput relative to scenarios where volume holograms are used. Performing an even number of diffractions using cross coupler 54 may mitigate any chromatic dispersion produced by the surface relief grating structure. Use of a non-diffractive input coupler such as input prism 70 may allow light 38 to be coupled into waveguide 50 without introducing chromatic dispersion. These examples are merely illustrative and, if desired, cross coupler 54 may be implemented using volume holograms and input prism 70 may be implemented using other input coupling structures (e.g., holograms or other diffraction gratings, an angled surface of waveguide 50, etc.). In another arrangement, substrate 110 may be omitted and surface relief grating substrate 112 may be placed in contact with surface 122 of grating medium 106.

If desired, optional light homogenization structures such as one or more layers of beam splitters 124 may be embedded within grating medium 106. Beam splitters 124 may be formed using metallic coatings, dielectric coatings, dielectric layers having different refractive indices, or other partially reflective structures. One or more beam splitters 124 may be mounted to surface 120, surface 122, surface 114, and/or surface 116 if desired. Beam splitters 124 may transmit a first portion of light 38 while reflecting a second portion of light 38. This may serve to laterally replicate the pupils of light 38 that are provided to surface relief grating structure 100, to output coupler 56, and eventually to the eye box (e.g., to ensure that a uniform intensity of light fills the eye box). In scenarios where more than one beam splitter 124 is provided in waveguide 50, the beam splitters may be partially overlapping, completely overlapping, or non-overlapping. The beam splitters may exhibit a variable reflectivity if desired (e.g., the beam splitters may exhibit greater reflectivity at one end than at an opposing end of the beamsplitters). The reflectivity may be continuously varied or varied in discrete steps.

Figure 6:
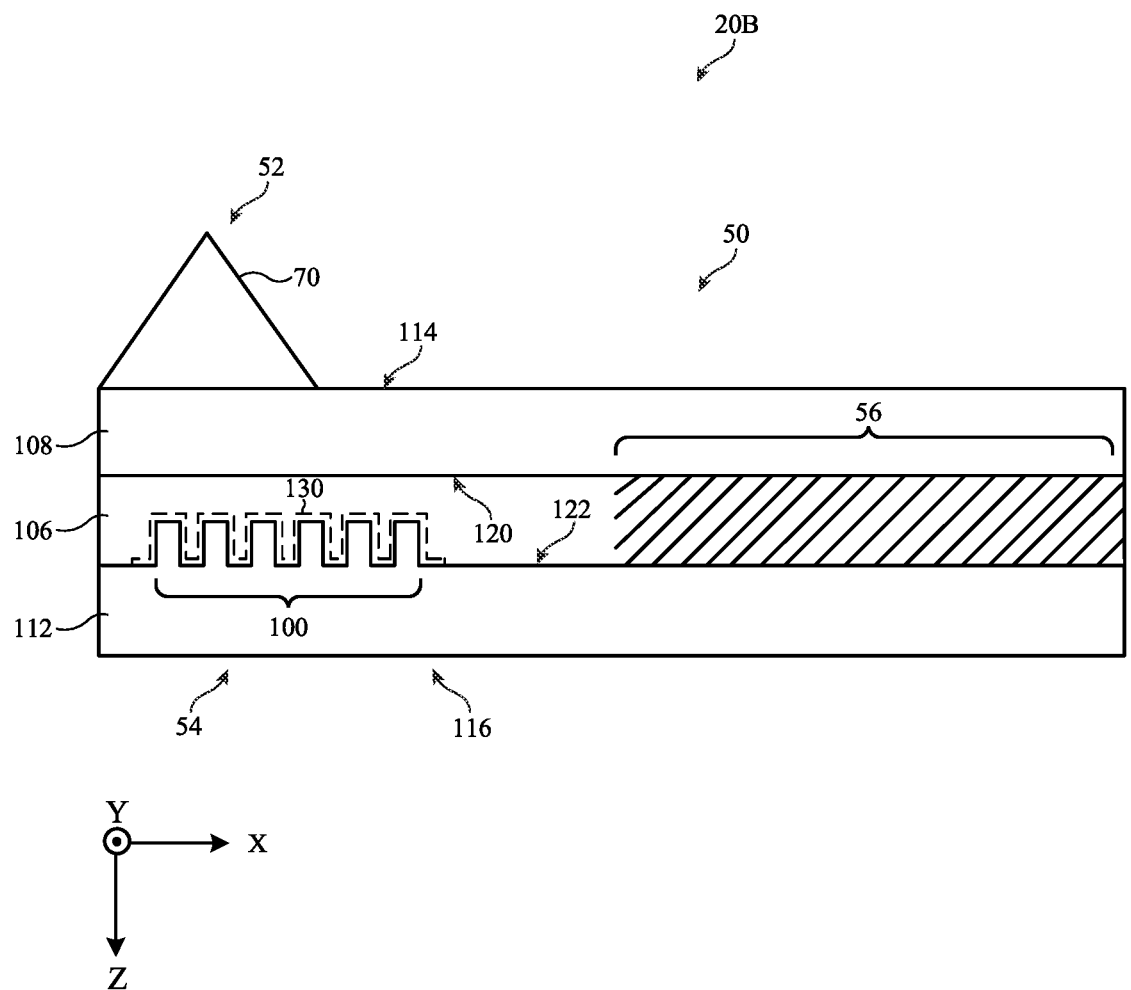
FIG. 6 is a cross-sectional top view of an illustrative waveguide having a cross coupler formed from a surface relief grating structure embedded in a grating medium that is used to form an output coupler for the waveguide in accordance with some embodiments.

In another suitable arrangement, surface relief grating structure 100 may be embedded within grating medium 106. FIG. 6 is a diagram showing how surface relief grating structure 100 may be embedded within grating medium 106. As shown in FIG. 6, substrate 110 may be omitted and surface relief grating substrate 112 may be placed into contact with surface 122 of grating medium 106 (e.g., grating medium 106 may be molded over surface relief grating substrate 112). Surface relief grating structure 100 may be embedded within grating medium 106. If desired, an optional transparent dielectric coating 130 may be layered over surface relief grating structure 100 (e.g., coating 130 may be interposed between surface relief grating structure 100 and grating medium 106). Coating 130 may serve to increase diffraction efficiency and broaden the angular response of surface relief grating structure 100. Coating 130 may be formed from titanium oxide, silicon nitride, tantalum pentoxide, or any other desired materials.

The examples of FIGS. 5 and 6 in which surface relief grating structure 100 is formed on the side of waveguide 50 opposite input prism 70 is merely illustrative. If desired, surface relief grating structure 100 may be formed on the same side of waveguide 50 as input prism 70, as shown in FIGS. 7 and 8.

Figure 7:
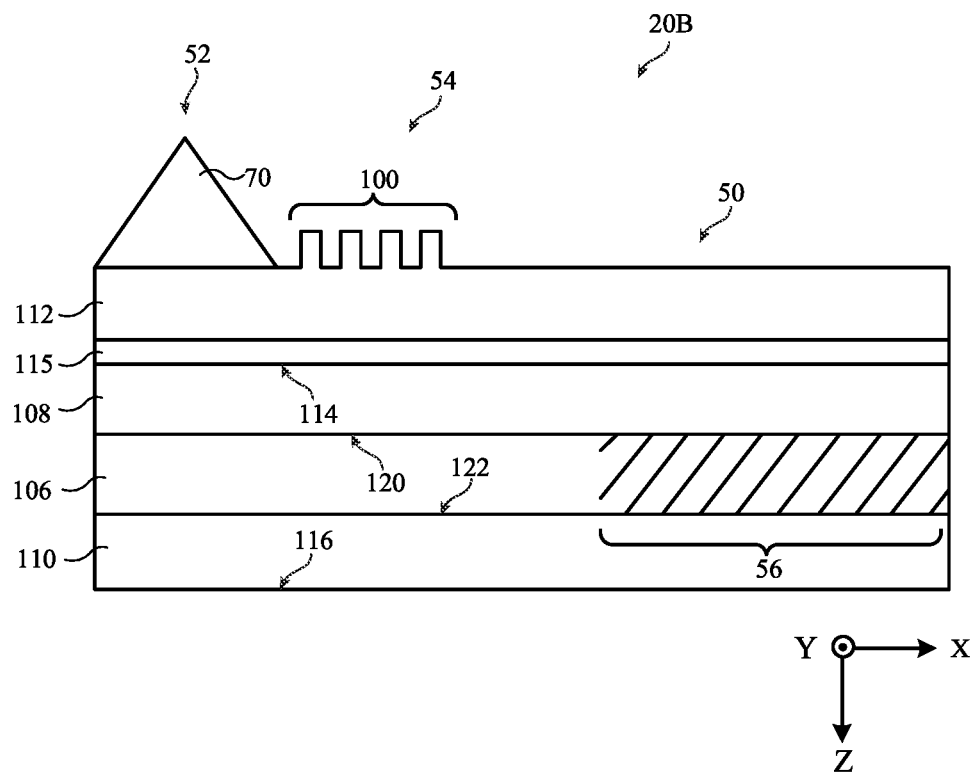
FIG. 7 is a cross-sectional top view of an illustrative waveguide having a cross coupler formed from a surface relief grating structure on the same side of the waveguide as an input coupling prism in accordance with some embodiments.

As shown in the example of FIG. 7, surface relief grating substrate 112 may be mounted to surface 114 of substrate 108 using adhesive layer 115. Input prism 70 may be mounted to surface relief grating substrate 112. Input prism 70 may couple light into waveguide 50. The in-coupled light may reflect off of one or more surfaces of waveguide 50 to surface relief grating structure 100.

Figure 8:
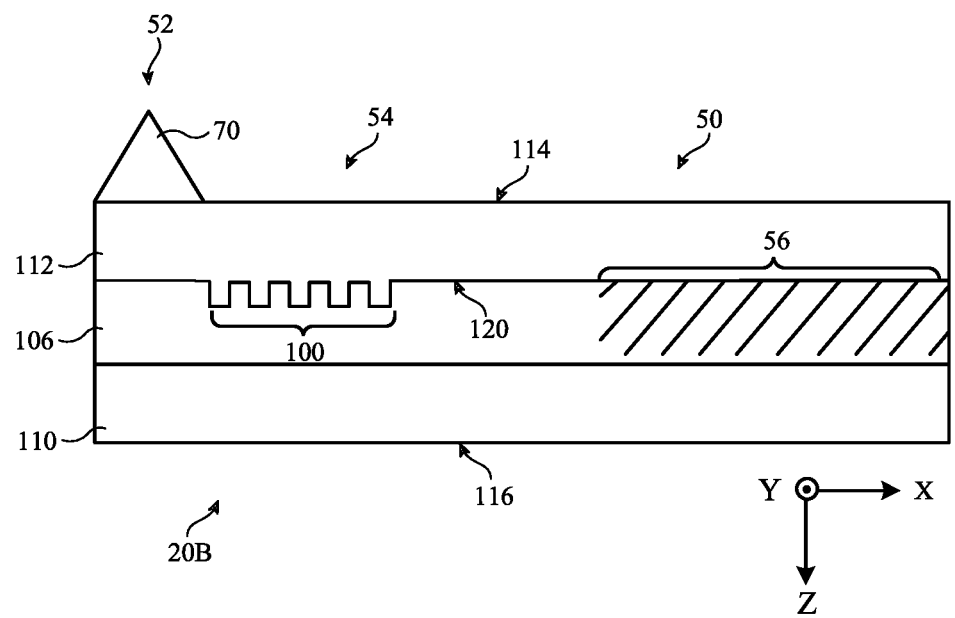
FIG. 8 is a cross-sectional top view of an illustrative waveguide having a cross coupler formed from a surface relief grating structure embedded in a grating medium at the same side of the waveguide as an input coupling prism in accordance with some embodiments.

As shown in the example of FIG. 8, substrate 108 may be omitted and surface relief grating substrate 112 may be placed into contact with surface 120 of grating medium 106. Surface relief grating structure 100 may be embedded within grating medium 106. Input prism 70 may be mounted to surface relief grating substrate 112. Input prism 70 may couple light into waveguide 50. The in-coupled light may be received directly at surface relief grating structure 100 or may be reflected off of one or more surfaces of waveguide 50 towards surface relief grating structure 100.

These examples are merely illustrative. If desired, more than one surface relief grating structure may be provided on waveguide 50. In these scenarios, multiple surface relief grating substrates 112 having associated surface relief grating structures may be layered over each other. Any desired input coupling structures may be used. Beam splitters 124 and/or antireflection coating 118 of FIG. 5 may be provided in the waveguides of FIGS. 6-8 if desired. Coating 130 of FIG. 6 may be layered under surface relief grating structure 100 of FIG. 8 if desired.

Figure 9:
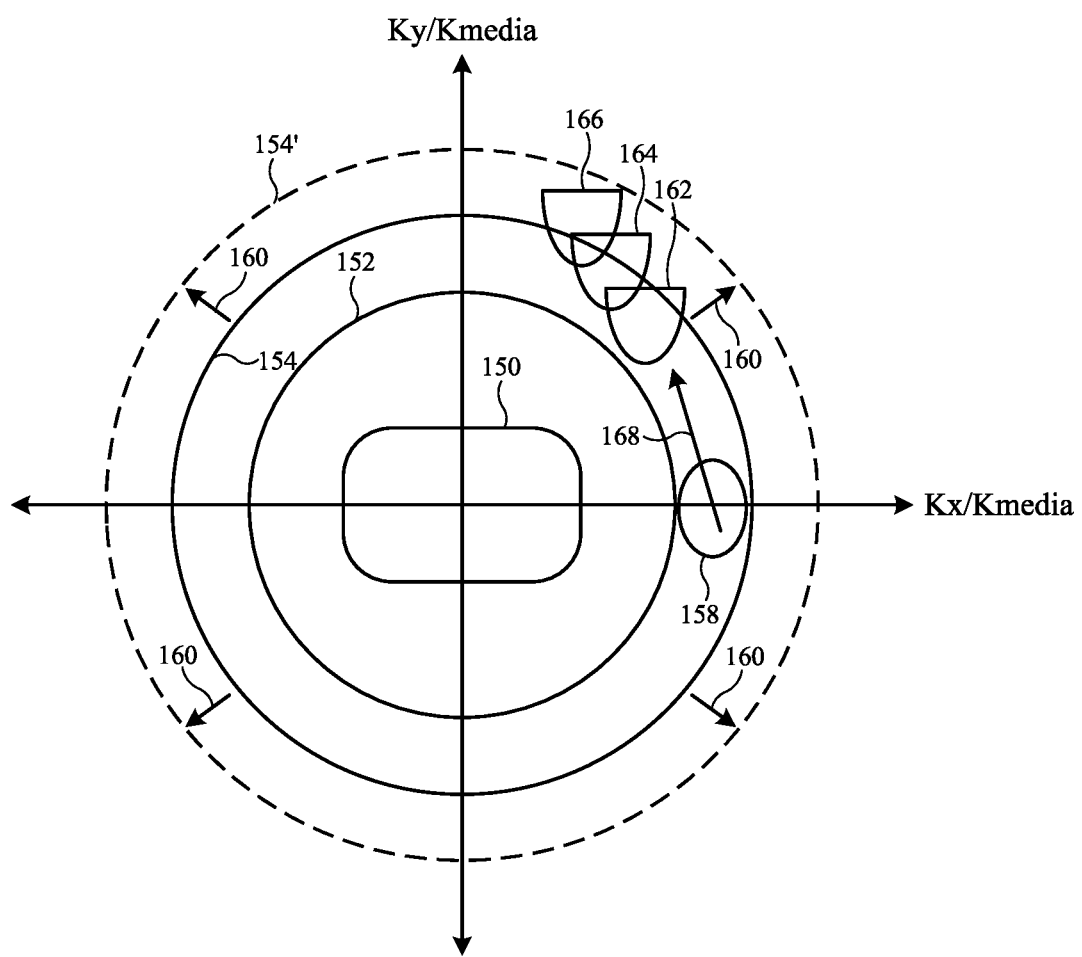
FIG. 9 is a k-space diagram illustrating how surface relief grating structures of the types shown in FIGS. 5-8 may be formed in a substrate having a relatively high index of refraction for ensuring that in-coupled light of different wavelengths propagates through a waveguide in accordance with some embodiments.

Surface relief grating substrate 112 may be provided with a relatively high index of refraction (e.g., an index of refraction greater than that of substrates 108 and 110 and greater than the bulk index of refraction of grating medium 106). FIG. 9 is a k-space diagram showing how forming surface relief grating substrate 112 with a relatively high index of refraction may allow the entire field of view of input prism 70 to be coupled back into waveguide 50 for propagation to output coupler 56 by total internal reflection for each wavelength of light 38.

As shown in FIG. 9, the horizontal axis plots $k_x/k_{media}$ and the vertical axis plots $k_y/k_{media}$, where $k_x/k_{media}$ represents the X component and $k_y/k_{media}$ represents the Y component of the k-vector for light propagating through optical system 20B. The Z component is omitted from FIG. 9 for the sake of clarity (e.g., FIG. 9 illustrates a two-dimensional projection of three-dimensional k-space). Region 150 represents the field of view from output coupler 56 (e.g., as provided at the eye box). Region 158 represents the light 38 that is coupled into waveguide 50 by input prism 70. Because input prism 70 does not introduce chromatic dispersion, the light coupled into waveguide 50 is represented by the same region 158 in k-space regardless of wavelength. Similarly, because any chromatic dispersion introduced into the system is mitigated by the time the light is coupled out of the waveguide, the field of view from output coupler 56 is represented by the same region 150 in k-space regardless of wavelength.

The first diffraction performed by surface relief grating structure 100 is schematically represented by arrow 168. Because the first diffraction introduces chromatic dispersion, different wavelengths of light are diffracted to different regions in k space such as regions 162, 164, and 166. Region 162 may correspond to a blue wavelength, region 164 may correspond to a green wavelength, and region 166 may correspond to a red wavelength, as just one example. The example of FIG. 9 only illustrates diffraction of the portion of region 158 below the horizontal axis for the sake of clarity. In practice, the portion of region 158 above the horizontal axis is also diffracted in the first diffraction to additional regions (e.g., additional regions corresponding to regions 162, 164, and 166) below the horizontal axis.

Curve 152 represents the lower limit at which total internal reflection can still be supported by waveguide 50. If the diffraction from region 158 produces light that falls within curve 152, the light will be diffracted at an angle at which waveguide 50 is incapable of supporting total internal reflection, and the light will not properly propagate to the output coupler. Curve 154 represents the upper limit of diffraction supported by surface relief grating substrate 112. If the diffraction from region 158 produces light that falls outside of curve 154, surface relief grating structure 100 will be unable to perform additional diffractions on the light (e.g., to couple the light back into the waveguide). In other words, the first diffraction from region 158 needs to produce light that falls between curves 152 and 154 for the light to be provided to output coupler 56. However, as shown in FIG. 9, the chromatic dispersion produced by the first diffraction may produce light that falls outside of this region for some wavelengths (e.g., for the wavelength associated with region 166). This may cause the cross coupler to fail to direct some of the wavelengths of light 38 to output coupler 56.

In order to mitigate these effects, surface relief grating substrate 112 may be provided with a material having a relatively high index of refraction (e.g., a relatively high index glass or other material). The refractive index of surface relief grating substrate 112 may be, for example, greater than the bulk index of refraction of grating medium 106. Providing the surface relief grating medium with a relatively high refractive index in this way may expand curve 154 to curve 154', as shown by arrow 160. As each of regions 162, 164, and 166 falls between curves 154' and 152, each wavelength of light from the first diffraction may be satisfactorily diffracted back into the waveguide at an angle suitable for total internal reflection (e.g., so that the light is properly directed towards the output coupler). Because surface relief grating structure 100 performs an even number of diffractions, the chromatic dispersion associated with arrow 168 is reversed by a corresponding subsequent diffraction in surface relief grating structure 100 (e.g., by the second diffraction associated with arrows 92 and 92' of FIG. 3).

Figure 10:
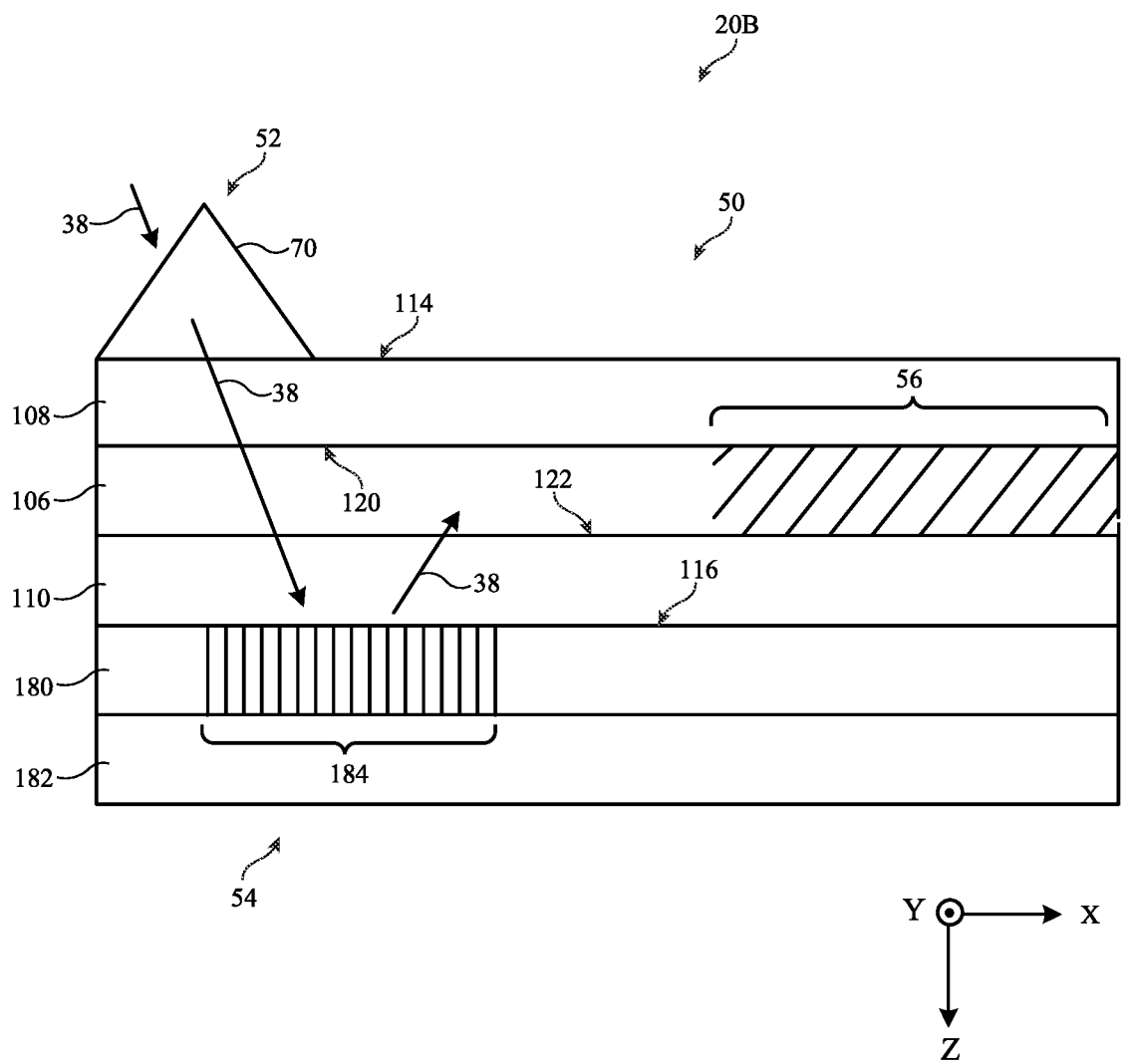
FIG. 10 is a cross-sectional top view of an illustrative waveguide having a cross coupler formed from volume holographic grating structures in accordance with some embodiments.

FIG. 10 is a diagram showing how cross coupler 54 may be formed holographic phase gratings such as volume holograms. As shown in FIG. 10, an additional grating medium 180 may be layered on surface 116 of substrate 110. An additional waveguide substrate 182 may be provided under grating medium 180. Cross coupler 54 may include volume hologram structures 184 in grating medium 180. Volume hologram structures 184 may include one or more at least partially overlapping volume holograms (e.g., a set of volume holograms that each diffract a respective range of wavelengths and/or incident angles at the same range of output angles). The volume holograms may be provided in separate layers of grating medium or may be superimposed with the same volume of the same layer of grating medium.

Input prism 70 may couple light 38 into waveguide 50 and towards volume hologram structures 184. Volume hologram structures 184 may perform an even number of diffractions on the in-coupled light, may expand the light in a direction parallel to the Y axis, and may diffract the light back into waveguide 50 at an angle suitable for total internal reflection. If desired, the volume holograms in volume hologram structures 184 may have fringes with constant pitch, a variable period, and/or a variable fringe angle. The period (e.g., κ) refers to the spacing between fringes as measured along the grating vector (i.e., the vector orthogonal to the fringes); the pitch (e.g., ρ) refers to the distance between fringes as measured along the grating surface (e.g., surface 116 or the surface of substrate 182); and the fringe angle refers to the angle between the grating surface normal (e.g., the Z axis) and the grating vector. In other words, the period may vary across structures 184 (e.g., may vary as a function of position along the X-axis of FIG. 10), the pitch may be constant across the structures 184, and the fringe angle may vary across structures 184 (e.g., may vary as a function of position along the X-axis of FIG. 10). Constant-pitch, variable-period gratings may help maintain high diffraction efficiency across a range of angles of incidence for a given wavelength. This type of volume phase holographic grating may in turn help avoid undesirable color shifts, efficiency losses, and brightness variations in the optical system. This example is merely illustrative and, if desired, other types of volume holograms or other holographic phase gratings may be used. If desired, grating medium 180 may be provided at surface 114 of substrate 108. Additional grating media may be layered over grating medium 180 if desired. One or more beam splitters 124 (FIG. 5) may be provided within grating medium 106 of FIG. 10 or elsewhere in or on waveguide 50 if desired. Antireflection coating 130 of FIG. 5 may be provided at output coupler 56 of FIG. 10 if desired.

Figure 11:
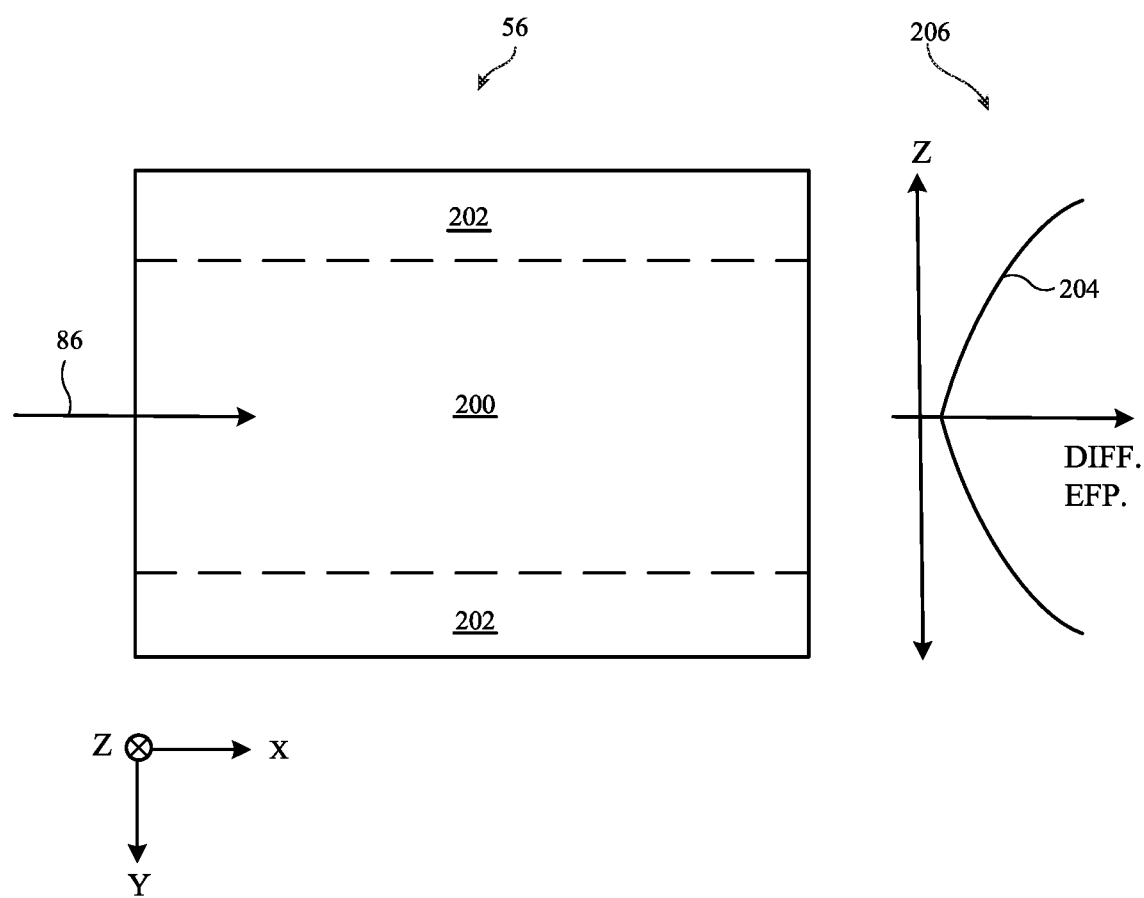
FIG. 11 is a front view of an illustrative output coupler having a variable diffraction efficiency in accordance with some embodiments.

In practice, DC light 86 (FIG. 3) may have a greater brightness than the vertically expanded light that is provided to output coupler 56 (e.g., as shown by arrows 92 and 92' of FIG. 3). In order to mitigate this difference in brightness, output coupler 56 may be provided with a diffraction efficiency that varies as a function of position along the Y axis. FIG. 11 is a diagram showing how output coupler 56 may be provided with a variable diffraction efficiency.

As shown in FIG. 11, output coupler 200 may have a central region 200 that receives DC light 86. The DC light may have greater brightness than diffracted light that is incident upon output coupler 200 within peripheral regions 202. To mitigate this difference in brightness, output coupler 56 may be provided with greater diffraction efficiency within peripheral regions 202 than within central region 200. This may allow the light provided to the eye box to exhibit uniform brightness across an entirety of the eye box.

If desired, output coupler 56 may include any desired number of regions having different diffraction efficiencies (e.g., where the regions closer to the central horizontal axis of output coupler 56 exhibit greater diffraction efficiency than regions farther from the central horizontal axis). In another suitable arrangement, the diffraction efficiency of output coupler 56 may be continuously varied as a function of position along the Y axis. Plot 206 shows one exemplary continuous diffraction efficiency for output coupler 56. As shown by curve 204, the diffraction efficiency may be a smoothly varying curve that exhibits a minimum at the center of output coupler 56 and maxima at the edges of output coupler 56. This is merely illustrative and, in general, curve 204 may exhibit any other desired shape. The diffraction efficiency of output coupler 56 may vary discretely or continuously along the X axis or any other axis if desired.

The example of FIG. 11 in which the diffraction efficiency of output coupler 56 varies as a function of position is merely illustrative. If desired, the diffraction efficiency of cross coupler 54 may vary as a function of position. Output coupler 56 of FIG. 11 may, for example, be replaced with cross coupler 54 (e.g., cross coupler 54 may have a variable diffraction efficiency as described above in connection with output coupler 56 of FIG. 11). Cross coupler 54 and output coupler 56 may both have a diffraction efficiency that varies continuously or discretely as a function of position along one or more axes, if desired. Holograms used to form cross coupler 54 and/or output coupler 56 may be comb-shifted if desired. Comb-shifted holograms may include a set of holograms in a first region of grating medium and a second set of holograms in an adjacent second region of the grating medium. The grating frequencies of the second set may each lie within adjacent frequency gaps between the grating frequencies of the first set (e.g., where the grating vectors for the first and second sets are oriented in the same direction). This may allow for more homogenous diffraction across the eye box, for example.

Figure 12:
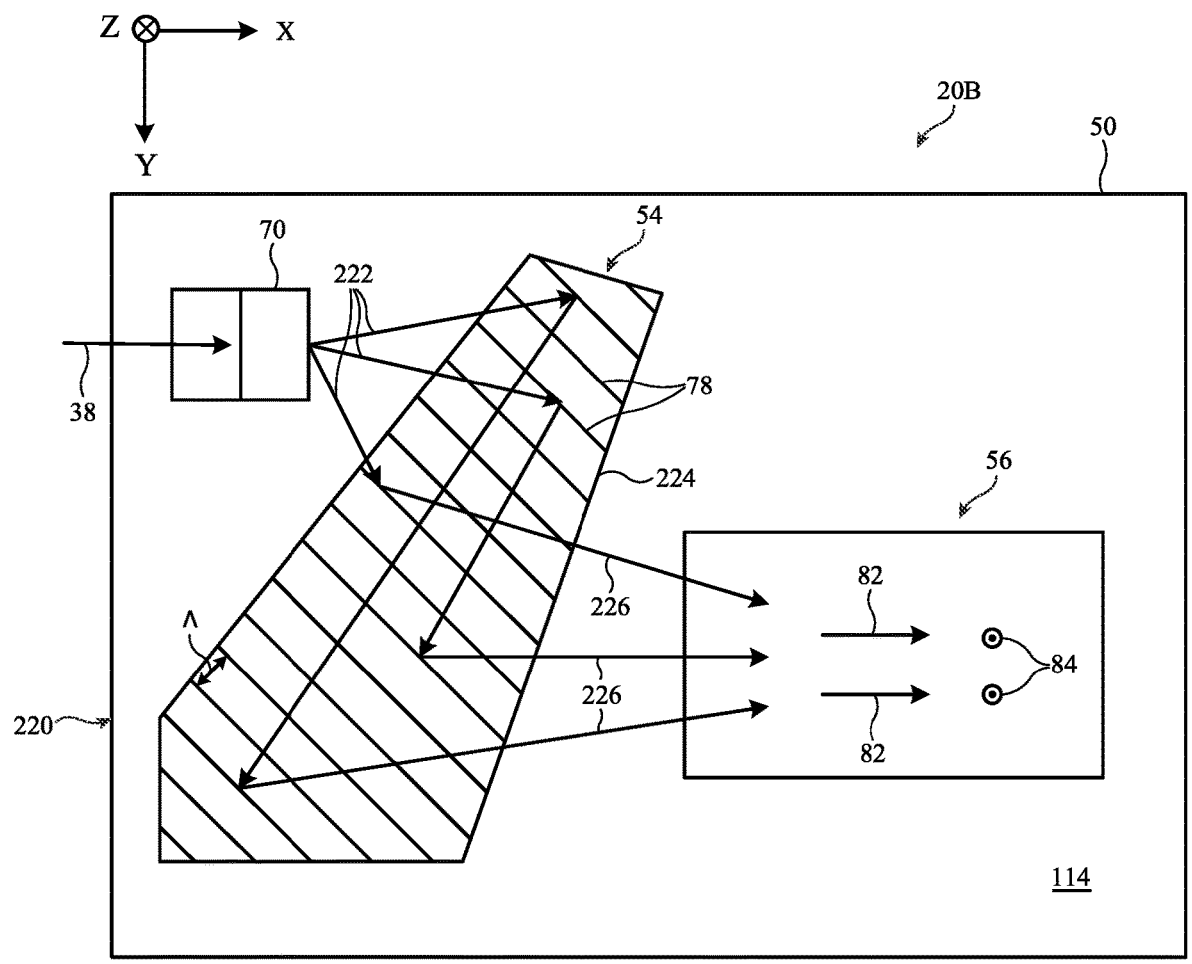
FIGS. 12 and 13 are front views of an illustrative optical system having a cross coupler with a single grating structure that diffracts in-coupled light an even number of times while expanding the light in a first direction and having an output coupler that expands the light in a second direction in accordance with some embodiments.

The examples above in which cross coupler 54 has two grating structures 72 and 74 for expanding light 38 while also diffracting light 38 an even number of times to mitigate chromatic dispersion is merely illustrative. In another suitable arrangement, cross coupler 54 may include a single grating structure having fringes oriented in the same direction for expanding light 38 while also diffracting light 38 an even number of times to mitigate chromatic dispersion. FIG. 12 is a diagram showing how cross coupler 54 may include a single grating structure having fringes oriented in the same direction for expanding light 38 while also diffracting light 38 an even number of times to mitigate chromatic dispersion As shown in FIG. 12, cross coupler 54 may include a single grating structure 236 having fringes 78 oriented in a single direction (e.g., fringes having grating vectors oriented in a single direction and characterized by a period Λ). At least some of cross coupler 54 may be laterally interposed (e.g., along the X axis) between input prism 70 and output coupler 56 (e.g., wherein input prism 70 is laterally interposed between at least some of cross coupler 54 and left edge 220 of waveguide 50). Input prism 70 may couple light 38 into waveguide 50, as shown by arrows 222. Grating structure 236 may expand the in-coupled light 38 in a first direction (whereas output coupler 56 may expand the light in a second direction) and may provide the light to output coupler 56, as shown by arrows 226. Grating structure 236 may be configured to diffract light 38 an even number of times by the time the light reaches output coupler 56, or by the time the light is coupled back into the waveguide for propagation by total internal reflection (e.g., to mitigate chromatic dispersion generated by a single instance of diffraction).

Figure 13:
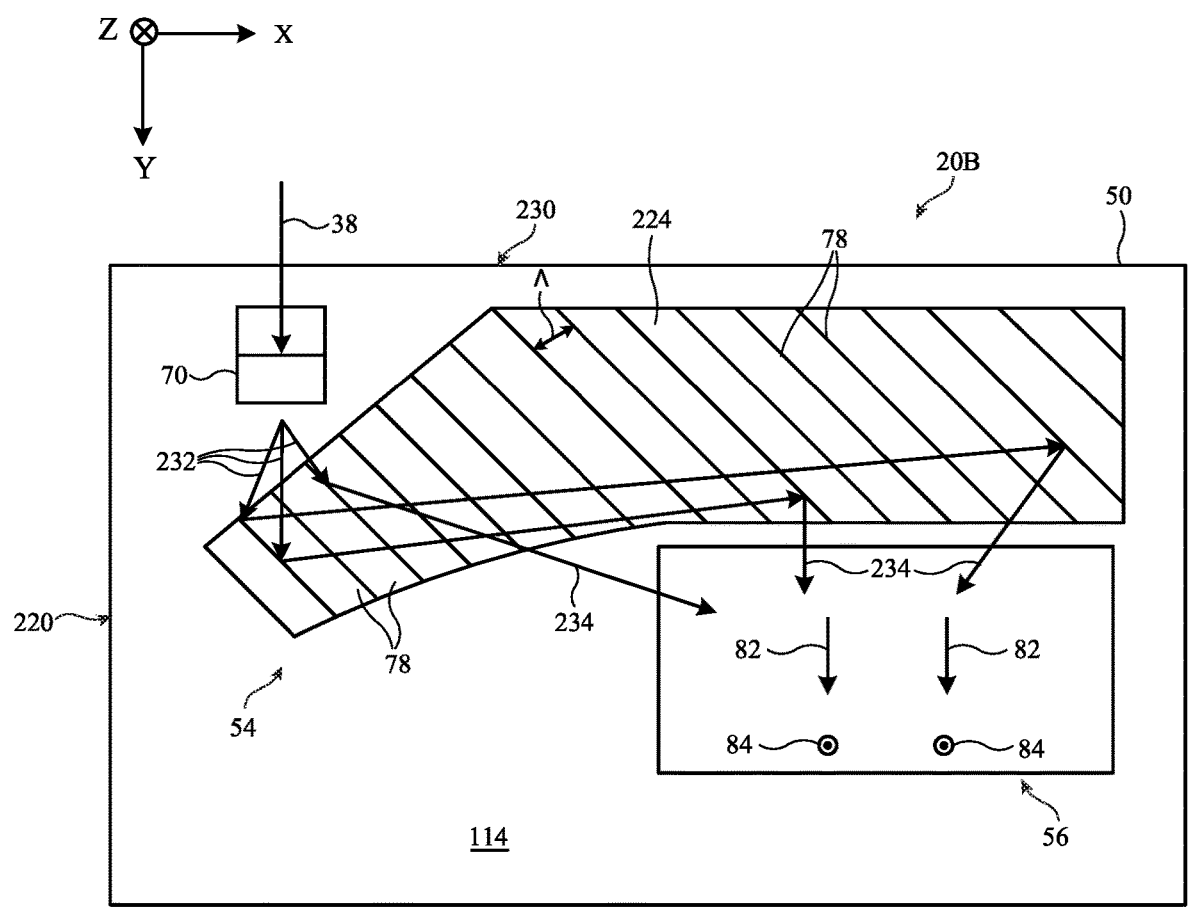

The example of FIG. 12 is merely illustrative. Cross coupler 54 having grating structure 224 may be interposed between other edges of waveguide 50 and output coupler 56. For example, as shown in FIG. 13, at least some of grating structure 224 for cross coupler 54 may be laterally interposed between top edge 230 of waveguide 50 and output coupler 56. Input prism 70 may be laterally interposed between at least some of grating structure 224 and edge 230. Input prism 70 may couple light 38 into waveguide 50 along the direction of the Y axis in this example, as shown by arrows 232. Grating structure 224 may expand light 38 and may diffract light 38 an even number of times before providing the light to output coupler 56, as shown by arrows 234. Output coupler 56 may expand the light in a direction different to the direction of expansion provided by grating structure 224. In the examples of FIGS. 12 and 13, grating structure 224 may include surface relief gratings, metagratings, holographic phase gratings such as volume holograms, etc. Grating structure 224 may be provided in the layers of waveguide 50 as shown by FIGS. 5-8 and 10 or at any other desired location on waveguide 50.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system (e.g., an electronic system including the display systems described herein). In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The display systems described herein may be used for these types of systems and for any other desired display arrangements.

In accordance with an embodiment, an optical system that redirects light produced by a display module towards an eye box, the optical system is provided that includes a waveguide, a non-diffractive input coupler configured to couple the light produced the display module into the waveguide, a cross coupler on the waveguide, the cross coupler is configured to perform an even number of diffractions on the light coupled into the waveguide by the non-diffractive input coupler, the even number of diffractions are configured to expand the light in a first direction and the waveguide is configured to propagate the light expanded in the first direction via total internal reflection and an output coupler on the waveguide, the output coupler is configured to couple the light expanded in the first direction by the cross coupler out of the waveguide while expanding the light in a second direction that is different from the first direction.

In accordance with another embodiment, the cross coupler includes a surface relief grating.

In accordance with another embodiment, the surface relief grating has fringes oriented in a first direction.

In accordance with another embodiment, the cross coupler further includes an additional surface relief grating having fringes oriented in a second direction different from the first direction.

In accordance with another embodiment, the surface relief grating overlaps the additional surface relief grating within an overlap region of the cross coupler.

In accordance with another embodiment, the overlap region has a non-uniform width.

In accordance with another embodiment, the surface relief grating and the additional surface relief grating are formed in a first surface relief grating substrate and the cross coupler further includes a second surface relief grating substrate that includes at least one additional surface relief grating and that is layered over the first surface relief grating substrate.

In accordance with another embodiment, the waveguide includes first and second waveguide substrates and a medium interposed between the first and second waveguide substrates and the surface relief grating and the additional surface relief grating are formed in a surface relief grating substrate layered on the first waveguide substrate.

In accordance with another embodiment, the output coupler includes a louvred mirror embedded in the medium.

In accordance with another embodiment, the medium includes a grating medium and the output coupler includes a set of volume holograms recorded in the grating medium.

In accordance with another embodiment, the surface relief grating has a non-binary profile.

In accordance with another embodiment, the waveguide includes a medium having first and second surfaces and a waveguide substrate layered on the first surface medium, the surface relief grating is formed in a surface relief grating medium layered on the second surface of the medium and the surface relief grating is embedded in the medium.

In accordance with another embodiment, the medium includes a grating medium and the output coupler includes a set of volume holograms recorded in the grating medium.

In accordance with another embodiment, the optical system includes an optically transparent coating on the surface relief grating and interposed between the surface relief grating and the grating medium.

In accordance with another embodiment, the optical system includes an antireflection layer on a surface of the waveguide substrate at the output coupler.

In accordance with another embodiment, the grating medium has a bulk index of refraction and the surface relief grating medium has an index of refraction that is greater than the bulk index of refraction of the grating medium.

In accordance with another embodiment, the output coupler has a diffraction efficiency that varies as a function of position along the first direction.

In accordance with another embodiment, the output coupler has a first diffraction efficiency along a central axis of the output coupler and a second diffraction efficiency at a peripheral edge of the output coupler that is greater than the first diffraction efficiency.

In accordance with another embodiment, the cross coupler has a diffraction efficiency that varies as a function of position.

In accordance with another embodiment, the waveguide includes first and second waveguide substrates and a first grating medium interposed between the first and second waveguide substrates, the cross coupler includes a substrate, a second grating medium, and a set of holographic phase gratings in the second grating medium and the second grating medium is interposed between the substrate and the first waveguide substrate.

In accordance with another embodiment, the set of holographic phase gratings include a plurality of at least partially overlapping volume holograms.

In accordance with another embodiment, the output coupler includes an additional set of holographic phase gratings in the first grating medium.

In accordance with another embodiment, the set of holographic phase gratings have fringes with a constant pitch at the substrate and a variable period.

In accordance with another embodiment, the non-diffractive input coupler includes a non-diffractive input coupler selected from the group consisting of: a prism mounted to the waveguide and an angled edge of the waveguide.

In accordance with another embodiment, the optical system includes a partially reflective beam splitter embedded in the waveguide, the light coupled into the waveguide by the non-diffractive input coupler is configured to hit the partially reflective beam splitter prior to being received at the cross coupler.

In accordance with another embodiment, the cross coupler includes a meta-grating on the waveguide.

In accordance with an embodiment, a head-mounted device is provided that includes, a display module that produces image light, a waveguide having first and second waveguide substrates and a grating medium interposed between the first and second waveguide substrates, a surface relief grating structure that is formed from the second waveguide substrate and that is embedded within the grating medium, an input prism mounted to the first waveguide substrate, the input prism is configured to couple the image light into the waveguide and towards the surface relief grating structure and an output coupler having a set of volume holograms in the grating medium, the surface relief grating structure is configured to: expand the image light along a first axis, perform an even number of diffractions on the image light and direct the image light into the waveguide and towards the output coupler, the output coupler being configured to expand the image light along a second axis perpendicular to the first axis and being configured to couple the image light out of the waveguide.

In accordance with another embodiment, the surface relief grating structure includes first and second surface relief gratings formed in the second waveguide substrate, the first surface relief grating includes first fringes with a first orientation, the second surface relief grating includes second fringes with a second orientation that is non-parallel with respect to the first orientation and the first and second surface relief gratings overlap within an overlap region of the surface relief grating structure.

In accordance with another embodiment, the head-mounted device includes an optically-transparent coating on the first and second surface relief gratings and interposed between the second waveguide substrate and the grating medium.

In accordance with another embodiment, the head-mounted device includes a partially reflective beam splitter on the grating medium, the surface relief grating structure is configured to receive the image light from the partially reflective beam splitter.

In accordance with another embodiment, the set of volume holograms has a diffraction efficiency that varies as a function of position along the first axis.

In accordance with an embodiment, a display system is provided that includes a waveguide, an input coupler configured to couple light into the waveguide, a cross coupler on the waveguide, the cross coupler includes a first diffractive grating structure having first fringes oriented in a first direction and a second diffractive grating structure having second fringes oriented in a second direction, the first diffractive grating structure overlaps the second diffractive grating structure within an overlap region of the cross coupler, the overlap region is aligned with the input coupler and the first and second diffractive grating structures are each configured to diffract the light coupled into the waveguide by the input coupler an even number of times and an output coupler on the waveguide, the output coupler is configured to receive the light diffracted by the cross coupler, expand the light in a given direction, and couple the light out of the waveguide.

In accordance with another embodiment, the first diffractive grating structure includes a first surface relief grating, the second diffractive grating structure includes a second surface relief grating, the first and second surface relief gratings are both formed in a surface relief grating substrate layer adhered to an external surface of the waveguide, the first and second surface relief gratings are configured to expand the light coupled into the waveguide by the input coupler in an additional direction perpendicular to the given direction, and the output coupler includes a set of volume holograms embedded in the waveguide.

In accordance with another embodiment, the first diffractive grating structure includes a first meta-grating on the waveguide and the second diffractive grating structure includes a second meta-grating on the waveguide.

The foregoing is merely illustrative and various modifications can be made to the described embodiments. The foregoing embodiments may be implemented individually or in any combination.

What is claimed is:

1. An optical system that redirects light produced by a display module towards an eye box, the optical system comprising:
   a waveguide comprising first and second waveguide substrates;
   a non-diffractive input coupler configured to couple the light produced by the display module into the waveguide;
   a cross coupler on the waveguide, wherein the cross coupler comprises a surface relief grating formed in a surface relief grating substrate and wherein the waveguide is configured to propagate the light via total internal reflection; and
   an output coupler on the waveguide, wherein the output coupler comprises a set of volume holograms recorded in a grating medium, wherein the output coupler is configured to couple the light out of the waveguide, wherein the grating medium has first and second opposing surfaces, wherein a third surface of the first waveguide substrate contacts the first surface of the grating medium, wherein the surface relief grating substrate is layered on a fourth surface of the first waveguide substrate, and wherein the second waveguide substrate is layered on the second surface of the grating medium.

2. The optical system of claim 1, wherein a fifth surface of the second waveguide substrate contacts the second surface of the grating medium.

3. The optical system of claim 2, wherein the non-diffractive input coupler is layered on the second waveguide substrate.

4. The optical system of claim 2, wherein the non-diffractive input coupler is mounted to the surface relief grating substrate.

5. The optical system of claim 2, wherein an antireflection coating is layered on a portion of the first surface of the grating medium and wherein the portion aligns with the set of volume holograms.

6. The optical system of claim 2, wherein a beam splitter is embedded within the grating medium.

7. The optical system of claim 2, wherein the surface relief grating substrate has a first index of refraction, wherein the surface relief grating substrate is adhered to the first waveguide substrate with an adhesive layer, and wherein the adhesive layer has a second index of refraction that is less than the first index of refraction.

8. The optical system of claim 7, wherein the non-diffractive input coupler is layered on the surface relief grating substrate.

9. The optical system of claim 7, wherein the non-diffractive input coupler is layered on the second waveguide substrate.

10. A display system comprising:
    a waveguide comprising a waveguide substrate with first and second opposing surfaces;
    an input coupler configured to couple light into the waveguide, wherein the input coupler is mounted to the first surface of the waveguide substrate;
    a cross coupler on the waveguide, wherein the cross coupler is configured to diffract the light coupled into the waveguide by the input coupler and wherein the cross coupler comprises a surface relief grating structure in a surface relief grating substrate;
    an output coupler on the waveguide, wherein the output coupler is configured to receive the light diffracted by the cross coupler and couple the light out of the waveguide, wherein the output coupler comprises a set of volume holograms recorded in a grating medium, wherein the grating medium is layered on the second surface of the waveguide substrate, and wherein the grating medium is interposed between the waveguide substrate and the surface relief grating substrate.

11. The display system of claim 10, wherein the first surface of the waveguide substrate is an external surface.

12. The display system of claim 10, wherein the input coupler comprises a prism.

13. The display system of claim 10, wherein a third surface of the grating medium contacts the second surface of the waveguide substrate.

14. The display system of claim 13, wherein the waveguide further comprises:
    an additional waveguide substrate interposed between the grating medium and the surface relief grating substrate.

15. The display system of claim 14, wherein a fourth surface of the grating medium contacts a fifth surface of the additional waveguide substrate.

16. The display system of claim 15, wherein the surface relief grating substrate is adhered to a sixth surface of the additional waveguide substrate.

17. An optical system that redirects light produced by a projector towards an eye box, the optical system comprising:
a waveguide comprising a waveguide substrate and configured to propagate the light via total internal reflection;
an input coupler configured to couple the light produced by the projector into the waveguide;
a cross coupler configured to diffract the light coupled into the waveguide by the input coupler, wherein the cross coupler comprises a surface relief grating structure with troughs and ridges formed in a surface relief grating substrate and wherein the troughs extend in a first direction;
an output coupler formed in an output coupler substrate and configured to couple the light out of the waveguide, wherein the output coupler substrate overlaps the surface relief grating substrate in a second direction orthogonal to the first direction, wherein the waveguide substrate overlaps the output coupler substrate in the second direction, and wherein the output coupler substrate is interposed between the waveguide substrate and the surface relief grating substrate.

18. The optical system of claim 17, wherein a ridge of the surface relief grating structure is interposed between two troughs of the surface relief grating structure in a third direction and wherein the second direction is orthogonal to the third direction.

19. The optical system of claim 17, wherein the input coupler overlaps the waveguide substrate in the second direction and wherein the waveguide substrate is interposed between the input coupler and the output coupler substrate.

20. The optical system of claim 17, wherein the waveguide further comprises an additional waveguide substrate and wherein the additional waveguide substrate is interposed between the waveguide substrate and the surface relief grating substrate.

* * * * *